Aug. 19, 1924.
R. RODRIAN
PROCESS FOR EXTRACTING METALS
Filed April 29, 1922
1,505,494
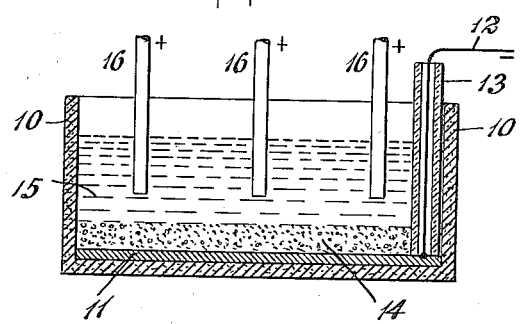
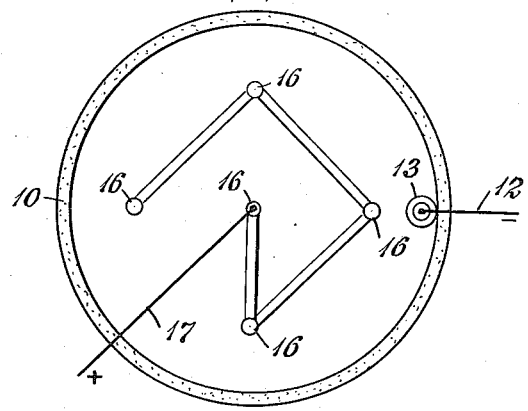
INVENTOR
RICHARD RODRIAN
BY
ATTORNEYS Patented Aug. 19, 1924.

1,505,494

UNITED STATES PATENT OFFICE.

RICHARD RODRIAN, OF NEW YORK, N. Y., ASSIGNOR, BY MESNE ASSIGNMENTS, TO HANS ADELMANN, OF NEW YORK, N. Y.

PROCESS FOR EXTRACTING METALS.

Application filed April 29, 1922. Serial No. 557,286.

*To all whom it may concern:*

Be it known that I, RICHARD RODRIAN, a citizen of Germany, and resident of the borough of Manhattan, city, county, and State of New York, have invented certain new and useful Improvements in Processes for Extracting Metals, of which the following is a specification.

My invention has for its object to provide a process for the easy and thorough extraction of metals from substances containing them, such as ores and other minerals, slag, scrap, etc.

In some cases it may be desirable to subject the raw material to a preliminary treatment for the removal of certain impurities or constituents. Such preliminary treatment may consist, for instance, of steps well known in the art, such as roasting or leaching with water or other solvents. Whether a preliminary treatment has been employed or not, I proceed by finely powdering or grinding the metal-bearing material, preferably in a dry condition. The comminuted material is then melted to form a coherent mass. In some cases the comminuted material is melted alone; in others, I may melt it with other metals or metal oxids, preferably in comminuted form, preferably lead or lead oxids, or substances containing lead or lead oxids. The use of a flux is desirable in some cases, and for this purpose I may use alkalies, such as caustic soda, carbonate of soda, lime, caustic potash, or carbonate of potash. The coherent mass resulting from this melting or smelting treatment is allowed to solidify and is then again finely powderer or broken up mechanically, unless it is of such a nature, as described below, that it can be brought into comminuted form without such mechanical action.

The powdered or otherwise comminuted material is subjected at ordinary temperature to an electrolytic treatment in a vessel either made entirely of metal or lined with metal on all or part of its inner surface.

The accompanying drawing illustrates as an example one form of electrolytic apparatus suitable for use in connection with this invention. Fig. 1 is a vertical section of the apparatus, and Fig. 2 is a plan view thereof.

I prefer to use vessels made of, or lined with, iron or lead, or vessels having a metallic inner surface at the bottom, such surface being either solid (a plate) or forming a bottom layer, for which latter purpose I may use mercury or an amalgam. The drawing shows a vessel 10 of non-conducting material with a metal plate 11 at the bottom and a wire 12 leading from said plate through a non-conducting tube 13 (which may be made of glass). In any event, the conducting inner surface at the bottom of the vessel (whether such surface forms part of an all-metal vessel or of a partial or complete inner lining, or is formed by a layer of mercury or similar material) constitutes the cathode of the electrolytic cell. The fine powder to be treated is simply spread on the said conducting bottom surface within the vessel, so as to cover such surface, as indicated at 14, the vessel also containing a suitable electrolyte, indicated at 15. The latter may be a concentrated solution of an alkali or alkali salt, preferably (on account of its low cost) caustic soda, or carbonate or sulfate of soda, etc. One or more positive electrodes are employed, generally a single rod, preferably of iron or lead, or a plurality of such rods 16 connected with one another, as indicated at 17. This anode, or anodes, preferably dip into the electrolyte from above.

Direct current, with a tension of about four volts between the electrodes of a cell, is employed, the strength of the current depending on factors such as the dimensions of the vessel or cell, the density or conductivity of the electrolyte, and the size and number of the anodes; such current strength may be from 10 to 100 amperes. As a rule, the greater the strength of the current, the more energetic and rapid will be the electrolytic action.

Under the influence of this action the metals contained as compounds with other elements in the comminuted mass under treatment will be reduced or set free and will separate at the bottom on the metallic cathode; the time required to complete the treatment will vary according to the nature of the material.

After the electrolytic treatment, the solid product is separated from the liquid electrolyte and washed with water. Such product contains the metal or metals in a finely-divided condition as pure metals, but during the subsequent drying of the product many of these metals will combine with the oxygen of the air, forming suboxids or other low oxids.

As an example of my invention, the following may be given: 100 pounds of powdered gold-bearing schist are melted with 25 pounds of soda ash, for instance in a crucible. The resultant mass is in a glass like condition and contains all of the original materials except such as have been driven off by heat, as for example, a portion of the sulphur, arsenic, etc. The resulting glass-like mass is then allowed to cool till it becomes hard, and is then broken up or comminuted to a fine powder, similar to ground glass. This powder is spread on the cathode bottom of an electrolytic vessel or cell such as described above, and at ordinary temperature and under atmospheric pressure, a current of, for instance, 30 amperes and 4 volts is passed through the cell. As a result of the electrolytic action the materials within the cell are partly in a solid condition and partly in liquid form, the solid material comprising the rock material and the metal (gold) which is reduced to metallic form, while the liquid comprises a solution mainly of caustic soda. After about twenty-four hours the reaction has been completed, the solid product is separated from the liquid, washed with water, and then allowed to dry.

Another example of my process is as follows: 100 pounds of powdered metal-bearing ore are added to 100 pounds of molten caustic soda and the mixture is heated, preferably with stirring, for instance to a temperature of 500° F., until all the ore has been opened up in and by the alkali, forming a homogeneous coherent mass, which is a brittle, dull, dark-colored, slag-like mass, containing all the original materials except those which, as in the preceding example, have been driven off by the heat. This mass is washed with water, thereby removing those constituents of the ore which have been dissolved by the alkali, such as silicates, compounds of silica and magnesia, and a small portion of the lead compounds, etc., while those constituents of the ore such as the major portion of the lead compounds and compounds of other metals which are insoluble in alkali remain undissolved, and the coherent mass thus falls apart, the undissolved portion now forming a fine powder or comminuted mass. This mass, which contains the metals to be recovered, is separated from the washing liquid and spread on the cathode bottom of the electrolytic vessel or cell, to be subjected to electrolysis, separation, washing and drying in the same manner as described in connection with the first example.

In some cases, the washed and dried product may be available for use without further treatment, but as a rule, it will be desired to extract the metal of metals from such product.

To recover the metal or metals from the washed and dried product (whether of these particular examples or not), I may employ various processes, many of them well known in the art. Among the processes available for this purpose, the following may be mentioned as particularly suitable: (1) again melting the product, with or without the addition of lead or lead oxids, and with or without the addition of fluxes; (2) again melting the product with or without the addition of lead or lead oxid and with or without fluxes, and then electrolyzing the molten mass in a crucible, the cathode being formed by said crucible or by part of it; (3) again melting the product over a layer of molten lead, and then electrolyzing the molten mass, the molten lead constituting the negative electrode or forming part thereof; (4) treating the product with mercury to form an amalgam; (5) spreading the product on top of a layer of mercury or of amalgam, or of molten lead, and causing electric sparks or an electric arc produced by a current of high potential, to pass through said product.

The resultant product from each of the above treatments is an alloy or amalgam which is then subjected to a refining or cupellation to separate the metals from each other for example, gold from lead, or gold from mercury.

Various modifications may be made without departing from the nature of my invention as set forth in the appended claims.

I claim:

1. The process which consists in electrolyzing a comminuted metal-bearing mass while it is in contact with the cathode, in the presence of an alkaline electrolyte, whereby there is obtained within said electrolyte a solid product containing a metal constituent separating the solid product from the electrolyte, washing such product and drying it, and finally recovering the metal constituent from such product.

2. The process which consists in electrolyzing a comminuted metal-bearing mass while it is in contact with the cathode, in the presence of an alkaline electrolyte, whereby a solid metal-bearing product is obtained separating the solid product from the electrolyte, washing such product and drying it.

3. The process which consists in electrolyzing a comminuted metal-bearing mass while it is in contact with the cathode, in the presence of an alkaline electrolyte, whereby a solid metal-bearing product is obtained and separating the solid product from the electrolyte.

4. The process which consists in electrolyzing a comminuted metal-bearing mass while it is in contact with the cathode, in the presence of an alkaline electrolyte.

5. The process which consists in comminuting such metal-bearing substances as will when melted produce a glass-like mass, then melting them to produce a glass-like mass, allowing such mass to cool and comminuting it, electrolyzing the comminuted mass while it is in contact with the cathode, in the presence of an alkaline electrolyte. whereby a solid metal-bearing product is obtained separating the solid product from the electrolyte, washing such product and drying it.

6. The process which consists in melting such comminuted metal-bearing substances as will when melted produce a glass-like mass, allowing such mass to cool and comminuting it, electrolyzing the comminuted mass while it is in contact with the cathode, in the presence of an alkaline electrolyte, whereby a solid metal-bearing product is obtained and separating the solid product from the electrolyte.

7. The process which consists in melting such metal-bearing substances as will when melted produce a glass-like mass, allowing such mass to cool and comminuting it, electrolyzing the comminuted mass while it is in contact with the cathode, in the presence of an alkaline electrolyte, whereby a solid metal-bearing product is obtained and separating the electrolyte from the solid metal-bearing product.

8. The process which consists in melting metal-bearing substances, cooling and comminuting the resulting mass, electrolyzing the comminuted mass while it is in contact with the cathode, whereby a solid metal-bearing product is obtained and separating the electrolyte from the solid metal-bearing product.

9. The process which consists in bringing comminuted metal-bearing material in contact with molten alkali, washing the resulting coherent mass and thereby causing it to fall apart and to form a comminuted product, and electrolyzing the resulting comminuted product while it is in contact with the cathode, in the presence of an alkaline electrolyte.

10. The process which consists in bringing comminuted metal-bearing material in contact with molten alkali, washing the resulting coherent mass and thereby causing it to fall apart and to form a comminuted product, electrolyzing the resulting comminuted product while it is in contact with the cathode, in the presence of an alkaline electrolyte, whereby a solid metal-bearing product is obtained, and separating the solid product from the electrolyte.

11. The process which consists in bringing comminuted metal-bearing material in contact with molten alkali, washing the resulting coherent mass and thereby causing it to fall apart and to form a comminuted product, electrolyzing the resulting comminuted product while it is in contact with the cathode, in the presence of an alkaline electrolyte, whereby a solid metal-bearing product is obtained separating the solid product from the electrolyte, washing such product and drying it.

In testimony whereof I have hereunto set my hand.

RICHARD RODRIAN.